US009291014B2

(12) United States Patent
Derrer et al.

(10) Patent No.: US 9,291,014 B2
(45) Date of Patent: Mar. 22, 2016

(54) BEARING ASSEMBLY

(75) Inventors: Siegfried Derrer, Höchstadt (DE);
Reinhard Kirsch, Höchstadt (DE);
Edgar Pickel, Sommerach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 696 days.

(21) Appl. No.: 12/784,965

(22) Filed: May 21, 2010

(65) Prior Publication Data

US 2010/0316322 A1    Dec. 16, 2010

(30) Foreign Application Priority Data

May 25, 2009  (EP) .................................. 09 006 942
Feb. 19, 2010  (DE) .......................... 20 2010 002 282

(51) Int. Cl.
| *F16C 19/30* | (2006.01) |
| *F16C 33/58* | (2006.01) |
| *E21B 21/02* | (2006.01) |
| *F16C 19/38* | (2006.01) |
| *F16C 19/49* | (2006.01) |
| *F16C 19/50* | (2006.01) |

(52) U.S. Cl.
CPC ................ *E21B 21/02* (2013.01); *F16C 19/38* (2013.01); *F16C 19/381* (2013.01); *F16C 19/49* (2013.01); *F16C 19/505* (2013.01); *F16C 2300/14* (2013.01)

(58) Field of Classification Search
CPC ...... F16C 19/38; F16C 2300/14; F16C 19/49; F16C 19/505; F16C 19/381
USPC ......... 384/452, 453, 454, 455, 618, 619, 620, 384/622; 285/121.5, 272, 278, 280
See application file for complete search history.

(56) References Cited

U.S. PATENT DOCUMENTS

| 1,956,648 | A | * | 5/1934 | Messinger | ..................... 384/606 |
| 2,195,501 | A | * | 4/1940 | Smith | ............................ 384/620 |
| 2,643,920 | A | | 6/1953 | Olszewski | |
| 3,003,836 | A | * | 10/1961 | Hill | ............................... 384/455 |
| 3,355,188 | A | | 11/1967 | Knickelmann | |
| 3,460,858 | A | | 8/1969 | Lentzen et al. | |
| 3,757,876 | A | * | 9/1973 | Pereau | .......................... 175/267 |
| 4,030,786 | A | * | 6/1977 | Schluter et al. | ............... 384/453 |

(Continued)

FOREIGN PATENT DOCUMENTS

| DE | 1192605 B | 5/1965 | |
| DE | 3905986 C1 | * 7/1990 | .............. F16C 19/52 |

(Continued)

*Primary Examiner* — Adam D Rogers
(74) *Attorney, Agent, or Firm* — Bryan Peckjian; SKF USA Inc. Patent Dept.

(57) ABSTRACT

A bearing assembly comprises a bearing enabling a rotatable body to rotate about a rotational axis relative to a stationary body. The bearing includes a bearing inner ring and a bearing outer ring, each having at least first and second roller body tracks provided in or on non-parallel surfaces of the ring. The respective roller body tracks of the bearing outer ring are aligned with the respective roller body tracks of the bearing inner ring and a row of roller bodies is disposed between each of the respective sets of roller body tracks. At least one of the rows of roller bodies comprises one of tapered rollers and spherical rollers, at least one of the rows of roller bodies supports at least axial forces and at least one of the rows of the roller bodies supports at least radial forces.

21 Claims, 14 Drawing Sheets

(56) References Cited

U.S. PATENT DOCUMENTS

| | | | |
|---|---|---|---|
| 4,126,361 A * | 11/1978 | Bottner et al. | 384/455 |
| 4,166,659 A * | 9/1979 | Gleichman | 384/620 |
| 4,190,116 A | 2/1980 | O'Neal et al. | |
| 4,363,608 A * | 12/1982 | Mulders | 417/423.12 |
| 4,422,697 A * | 12/1983 | Gugel et al. | 384/452 |
| 4,828,405 A * | 5/1989 | Sinner | 384/455 |
| 4,861,171 A * | 8/1989 | Adachi | 384/455 |
| 4,906,112 A * | 3/1990 | Gobel et al. | 384/548 |
| 4,989,999 A * | 2/1991 | Siemensmeyer | 384/455 |
| 5,074,677 A * | 12/1991 | Andree et al. | 384/448 |
| 5,251,709 A | 10/1993 | Richardson | |
| 5,433,536 A * | 7/1995 | Bergling | 384/620 |
| 6,913,096 B1 | 7/2005 | Nielsen et al. | |
| 8,523,453 B2 * | 9/2013 | Loeschner et al. | 384/571 |
| 8,540,092 B2 * | 9/2013 | Roodenburg et al. | 212/253 |
| 8,950,945 B2 * | 2/2015 | Bouron et al. | 384/455 |
| 9,004,776 B2 * | 4/2015 | Capoldi et al. | 384/620 |
| 2012/0076655 A1 * | 3/2012 | Stiesdal | 416/174 |

FOREIGN PATENT DOCUMENTS

| | | |
|---|---|---|
| DE | 102007019482 A1 | 11/2008 |
| GB | 1088257 A * | 10/1967 |

* cited by examiner

BEARING ASSEMBLY

CROSS-REFERENCE

This application claims priority to European patent application no. 09 006 942.8, filed May 25, 2009, and to German utility model application no. 20 2010 002 282.7, filed Feb. 19, 2010, both of which are incorporated by reference as if fully set forth herein.

TECHNICAL FIELD

The present invention generally relates to a bearing assembly, e.g., for a drilling rig, such as an oil drilling rig. Preferred embodiments concern a bearing assembly for a swivel or a top drive of a drilling rig.

KNOWN ART

A known drilling rig is shown in FIG. 1 and includes a rinse head or swivel head 1, which is shown in more detail in FIG. 2. The swivel head 1 includes a swivel or base body 2, which comprises a suspension bracket 3 (e.g., a hook), on which a cable of a lifting device can engage in order to raise and lower the assembly 1. A support 4 for a drill pipe or drill string is disposed in the lower portion of the bearing assembly 1. The drill pipe may be rotatably driven separately, e.g., by a kelly drive. In the alternative, a drive device for the drill pipe/string can be integrated into the swivel head, in which case, it is called a top drive. In any event, a bearing 5 is required to enable the support 4 with the drill pipe/string to rotate relative to the swivel body 2 about a rotational axis 6.

The swivel 1 enables a drilling fluid to be communicated, e.g., from a stationary, non-rotating fluid source to the rotating drill pipe or drill string.

In the prior art, tapered roller thrust bearings are typically used to support the main axial loads that arise during the drilling process. In case of varying axial loads, a housing washer can be biased by springs. In the alternative to the tapered roller bearings, spherical roller thrust bearings (radially free) can be utilized. In some cases, the spherical roller thrust bearing is designed so that it can also support radial loads. For supporting the radial loads that arise during the drilling process, for example, two radial bearings (e.g., cylindrical roller bearings) are often utilized in the upper and lower portions, respectively.

The previously-known embodiment shown in FIG. 2 uses a cylindrical roller bearing as a radial bearing in the lower portion and a tapered roller thrust bearing for supporting the main axial loads in the middle portion. A tapered roller bearing that can support radial loads as well as axial loads in small amounts is mounted in the upper portion. Thus, the three bearings 5 or bearing functions are disadvantageously spread out over a relatively long distance in the axial direction of the swivel 1.

In the alternative, a spherical roller thrust bearing, which is designed to also support radial loads, could also be used in such an embodiment. Mutually-employed bearings, e.g., spherical roller thrust bearings and/or tapered roller bearings, are known. For supporting the opposing axial load, a cylindrical roller thrust bearing can also be utilized, wherein a radial cylindrical roller bearing is then utilized in the upper portion for supporting the radial load.

SUMMARY

It would thus be desirable to provide a more compact bearing assembly.

In addition or in the alternative, it would be desirable to provide a bearing assembly that can be mounted or assembled in a less complex manner. For example, it would be advantageous if a precise alignment of the different bearings is not required during the mounting or assembly process.

In one aspect of the present teachings, bearing assemblies are taught that may have a relatively compact construction, e.g., a relatively short height in the axial direction and/or a relatively small outer diameter.

In addition or in the alternative, the bearing assemblies may be relatively easy to mount and assembly, wherein the alignment complexity is reduced.

In another aspect of the present teachings, a bearing assembly may preferably comprise a bearing inner ring consisting of one part or composed of two parts and a bearing outer ring consisting of one part or composed of two parts. At least two tracks are defined, e.g., machined, in the bearing inner ring as well as also in the bearing outer ring. At least two rows of roller bodies are disposed between the respective tracks and preferably at least one of the rows of roller bodies is selected from tapered rollers and spherical rollers.

In preferred embodiments, one of the rows of the roller bodies can be formed and disposed exclusively for supporting forces acting in the direction of the axis (axial forces). In addition or in the alternative, both the bearing inner ring and the bearing outer ring can be formed in one-piece.

In another aspect of the present teachings, at least one of the bearing rings can include at least one thread for connecting with a mounting part via a screw.

In another aspect of the present teachings, one of the rows of roller bodies, preferably tapered rollers, is disposed so that they can support forces acting exclusively in the direction of the axis.

In another aspect of the present teachings, one of the rows of roller bodies can be cylindrical rollers that are disposed so that they can support exclusively radial forces.

In another aspect of the present teachings, one of the rows of roller bodies can be disposed between the tracks so that they can support axial as well as radial forces. In this case, the roller bodies supporting the axial and radial forces may be one of cylindrical rollers, tapered rollers or balls disposed at an angle to the axis of the bearing assembly.

In another aspect of the present teachings, one or both of the bearing inner ring and the bearing outer ring may be provided with bores extending in the direction of the axis. Such bores may be used to affix the ring to a mounting part, e.g., via a pin, bolt, screw or, e.g., another type of projection extending through the bore into the mounting part.

In another aspect of the present teachings, at least one track can be formed by or on a track ring that is biased by a spring element in the axial direction relative to the bearing ring carrying it. In a particularly preferred embodiment, the bearing inner ring may be one-part, the bearing outer ring may be two-parts and a track ring may be disposed in each of two parts of the bearing outer ring. One or both of the track rings may be biased in the axial direction by a spring element.

In another aspect of the present teachings, the bearing inner ring or the bearing outer ring may include gear teeth for engaging a drive pinion that is driven, e.g., by an electric motor or other drive means, e.g., for rotating the drill pipe or drill string relative to the swivel body.

The bearing assembly is preferably utilized in a swivel head for a drilling rig and the rotational axis is preferably disposed vertically during use. A bearing assembly of the present teachings is configured or designed, in more preferred embodiments, to be the sole bearing of the drilling rig swivel.

In preferred embodiments, bearing assemblies according to the present teachings make it possible that all the forces, which arise during the drilling process, can be supported with a screwed-on bearing unit.

In another aspect of the present teachings, the axial loads can be supported by one or by two thrust bearings, likewise the torque loading of the bearing assembly. A radial bearing supports the radial loads.

A spherical roller thrust bearing also may be utilized with the present bearing assemblies. The two thrust bearings may be axially biased by springs. The shaft or support for the drill pipe can be connected together with the rotating inner ring via one or more screws. The housing (swivel body) of the bearing assembly also can be connected with the outer ring(s) via one or more screws.

The inner ring as well as the outer ring can be embodied in a one-piece manner, for which assembly openings are provided in this case for inserting the roller bodies.

In preferred embodiments, bearing assemblies according to the present teachings are relatively simple and cost-effective, because the bearing rings can be connected together with the mounting parts using screw connections. In this case, individual adjustments of the individual bearings may not be required after assembly.

Further, it is preferable that the shafts and the housing tolerances have no influence on the bearing clearance.

The present teachings allow, in certain embodiments, multiple bearings of the known art to be replaced by a single, relatively-compact bearing unit.

While the present teachings are particularly applicable to vertical drilling rigs, bearing assemblies according to the present teachings can also be advantageously utilized in horizontal drilling applications, such as, e.g., tunnel boring machines. The present teachings are more generally applicable to any bearing operation, in which a rotatable body is rotatably supported relative to a stationary body and both axial and radial forces must be supported by the bearing.

Further features, objects and advantages of the invention will be understood from the following description of exemplary embodiments and the appended claims in view of the attached drawings.

DETAILED DESCRIPTION OF THE INVENTION

Each of the additional features and teachings disclosed below may be utilized separately or in conjunction with other features and teachings to provide improved bearing assemblies, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
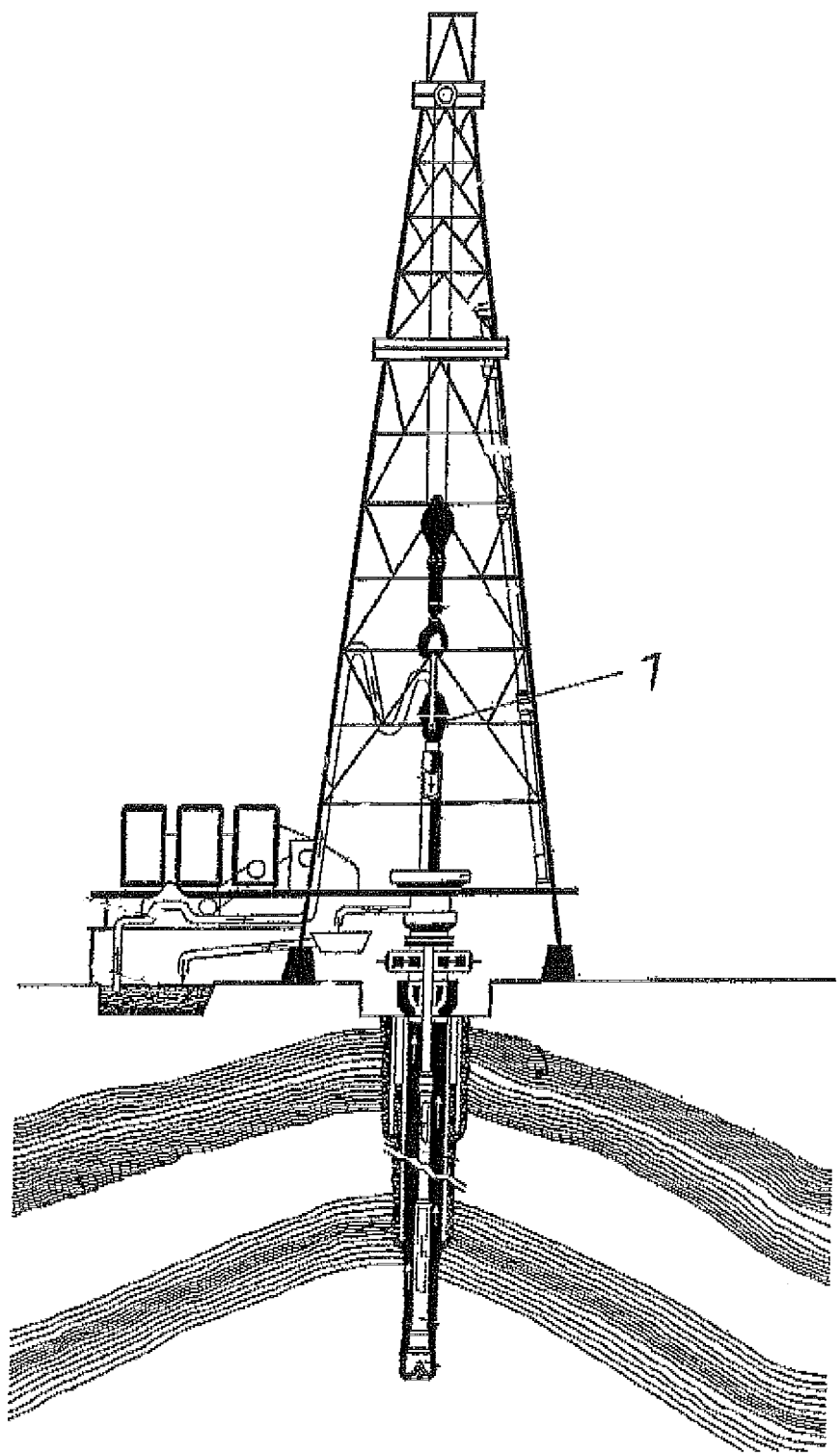
FIG. 1 shows a known drilling rig.
Figure 2:
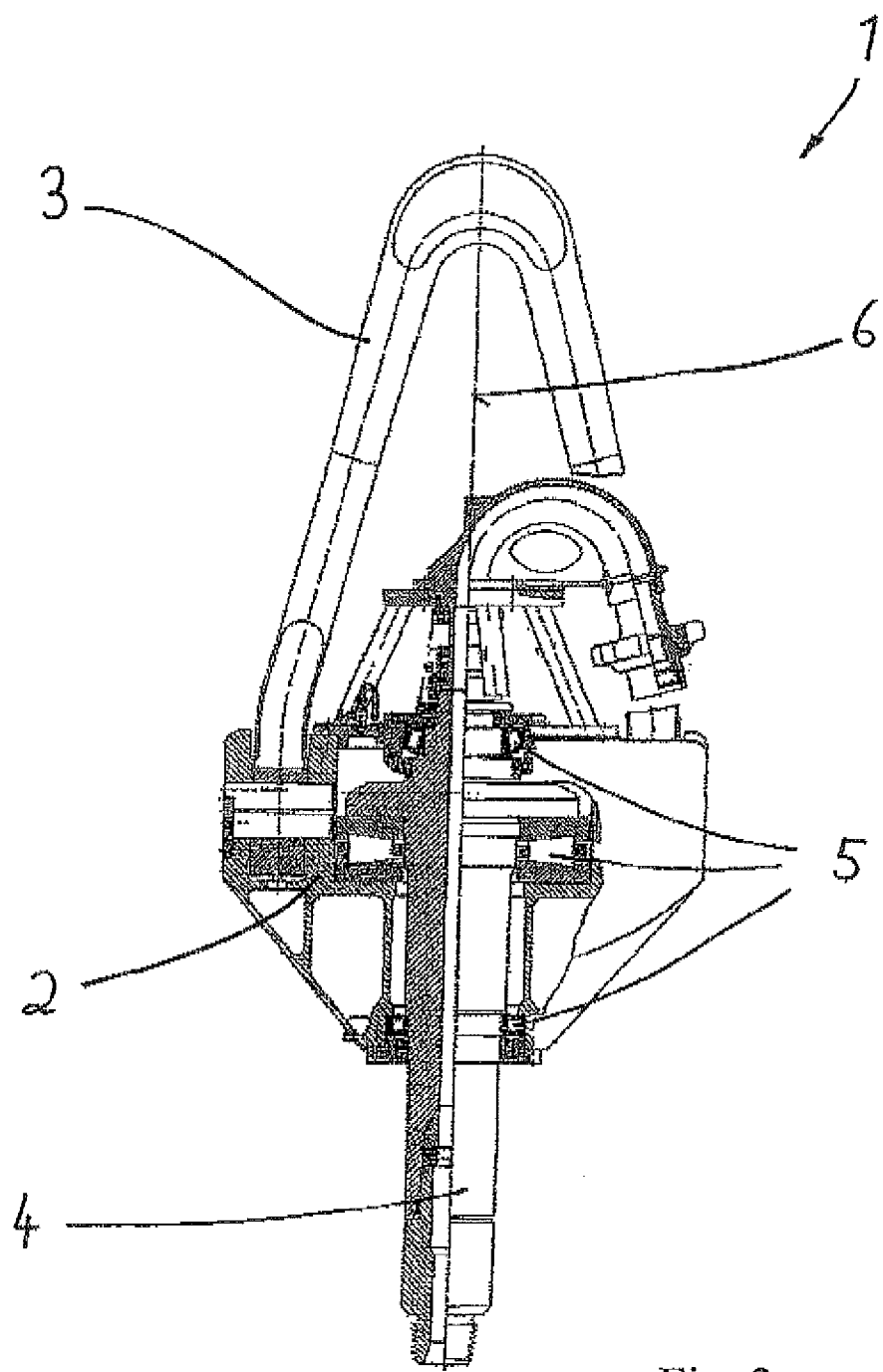
FIG. 2 shows a known bearing assembly for the drilling rig of FIG. 1.
Figure 3:
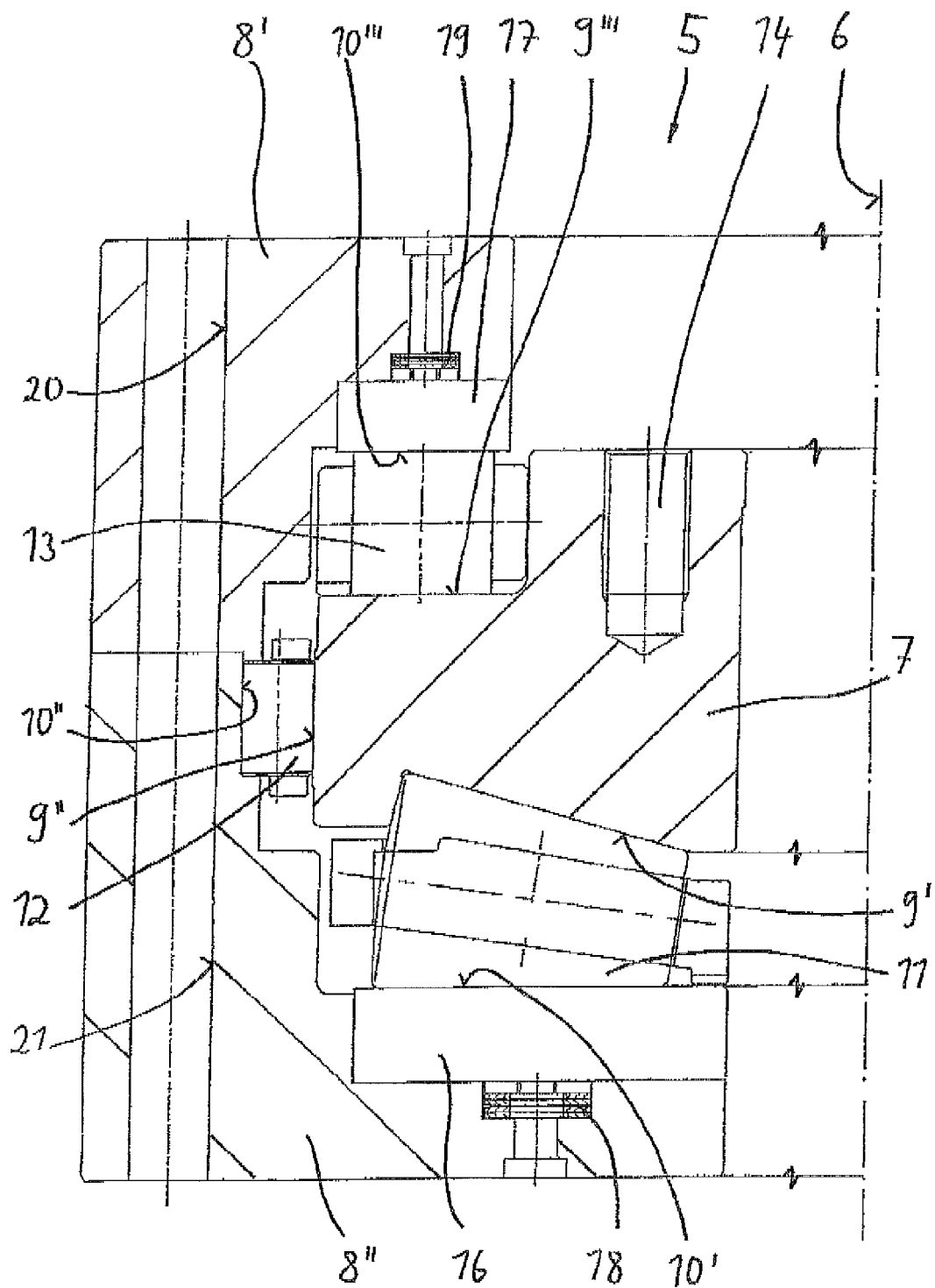
FIG. 3 shows a radial cross-section through a representative bearing assembly according to the present teachings.

In FIG. 3, a first representative bearing 5 according to the present teachings is shown. This bearing 5 enables a support 4 (see FIG. 2) for the drill pipe or drill string to rotate relative to the swivel body 2. In this preferred embodiment, the support 4 rotates about the vertical axis 6.

The bearing 5 of FIG. 3 includes a one-piece bearing inner ring 7 and a two-piece bearing outer ring 8', 8". The two parts 8', 8" of the bearing outer ring are connected by a screw connection. For this purpose, through-bores 20 and 21 may be provided for a notillustrated screw.

At least two (in the present embodiment, three) tracks 9', 9", 9''' are defined, e.g., machined, in the bearing inner ring 7. Likewise, at least two (in the present embodiment, three) tracks 10', 10", 10''' are defined, e.g., machined, in the bearing outer ring 8', 8". At least two (in the present embodiment, three) rows of roller bodies 11, 12 and 13 are disposed between the tracks 9', 9", 9''' and 10', 10", 10''', respectively.

The part of the bearing, which is formed by the roller bodies 11, is constructed as a tapered roller thrust bearing and is provided for supporting the axial forces that arise during the drilling process, i.e. forces acting in the direction of the rotational axis 6. In the exemplary embodiment of FIG. 3, the part of the bearing with the roller bodies 13 is also formed as a pure thrust bearing, in this case as a cylindrical roller bearing.

However, the part of the bearing with the roller bodies 12 is embodied as a pure radial bearing, e.g., as a cylindrical roller bearing that can support exclusively radial forces. The use of a tapered roller bearing (with the roller bodies 11) has the particular advantage that the outer diameter of the bearing can be smaller (for the same load bearing capacity) than in the case of a cylindrical roller bearing, which results due to the tapered contour of the roller bodies, i.e. the tapered roller bearings narrow in the direction towards the rotational axis. Furthermore, less skidding results, in particular at high rotational speeds, when using tapered roller bearings than for a cylindrical roller bearing, which advantageously results in less heating of the bearing and also less wear.

For the attachment of the inner ring 7 to a mounting part (e.g. support 4 or swivel body 2), at least one thread 14 (of which only one can be seen) is defined, e.g., machined, in the inner ring 7. In this exemplary embodiment, discrete track rings 16 and 17 are inserted into the bearing outer ring 8' and 8", respectively, e.g., in corresponding annular grooves defined in the respective rings 8', 8". The roller bodies 11 and 13 roll on the track rings 16 and 17, respectively. Spring elements 18 and 19 are operatively disposed between the track rings 16 and 17 and the bearing outer rings 8' and 8" respectively supporting the track rings 16 and 17. The spring elements 18 and 19 generate a spring force in the direction of the axis 6, i.e. the axial direction.

The three respective bearing functions are thus realized in a very compact way by the roller body rows 11, 12 and 13, in which the respective tracks 9', 9", 9"' for these roller body rows 11, 12, 13 are formed on adjacent surfaces of the bearing inner ring 7. Moreover, the tapered roller bodies 11 each have a first end surface and a second end surface that is smaller than the first end surface, and the roller body rows are arranged such that, the first end surfaces of the tapered roller bodies 11 are arranged in a band on a conical surface which conical surface intersects the roller bodies 13 of the third row of roller bodies. Also, a projection of the roller bodies 13 of the third row of roller bodies, in the direction of the rotational axis, intersects the roller bodies 11 of the first row of roller bodies and does not intersect the roller bodies 12 of the second row of roller bodies.

Figure 4:
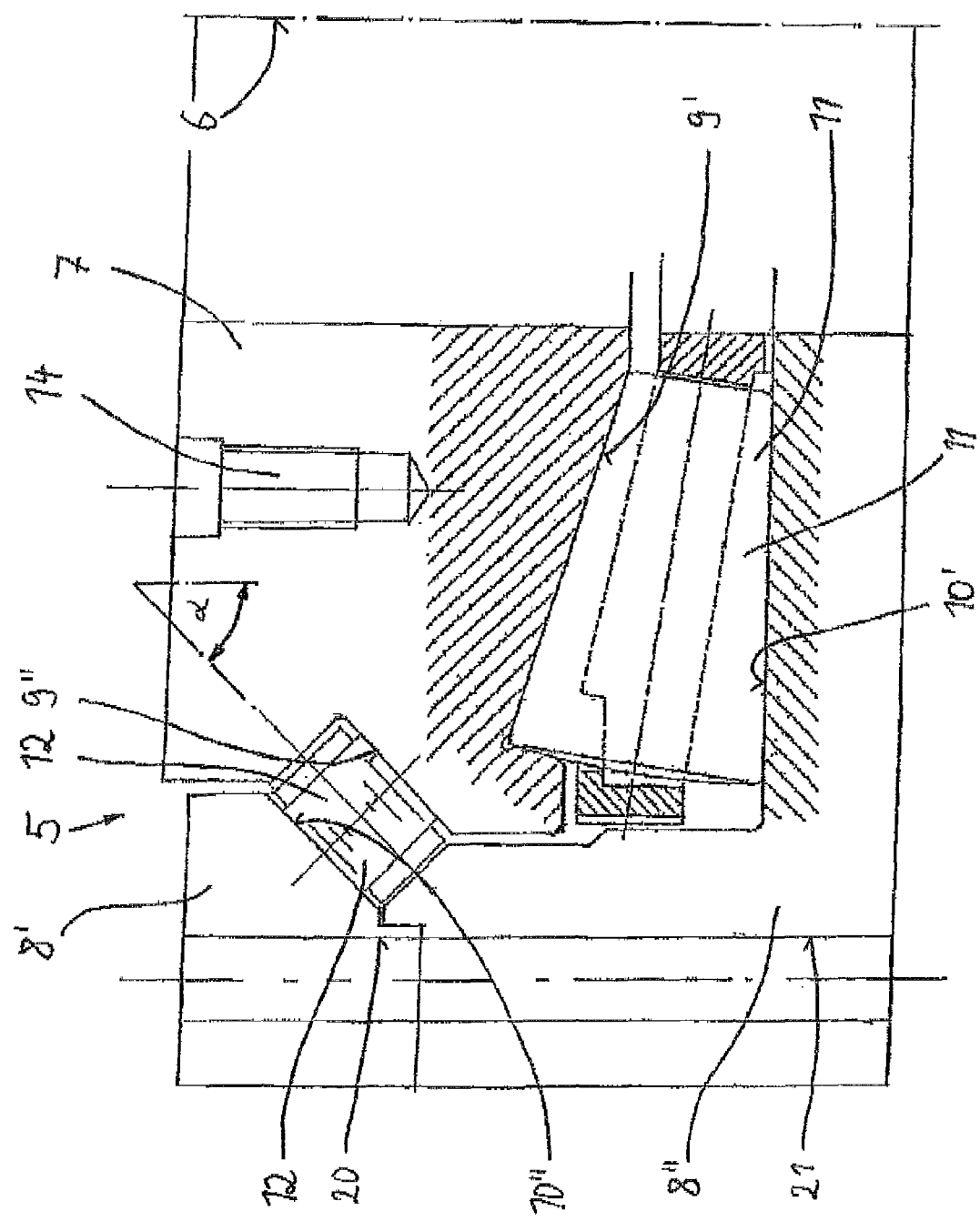
FIG. 4 shows an alternate to the embodiment shown in FIG. 3.

In FIG. 4, an alternative design of the first representative bearing 5 is shown. In this case as well, a tapered roller thrust bearing is formed by roller bodies 11, for which the one-piece bearing inner ring 7 has a track 9' and the two-piece bearing outer ring 8', 8" has a track 10' in part 8". Thus, the tapered roller bearing with the roller bodies 11 is again embodied as a pure thrust bearing, exactly as in FIG. 3, i.e. it does not support radial forces. In addition, a second part of the bearing with roller bearings 12 is provided for supporting combined radial and axial loads, wherein the inner ring track 9" is defined, e.g., machined, directly in the inner ring 7, while the corresponding outer ring track 10" is defined, e.g., machined, in the bearing outer ring 8'.

Thus, the part of the bearing with the roller bodies 12 is embodied as a cylindrical roller bearing, wherein the rotational axis of the cylindrical rollers is, of course, disposed at an angle α to the axis 6. In this exemplary embodiment, this angle is approximately 45°; it can, however, assume other values, e.g., preferably between about 30-60°.

In FIGS. 5, 6 and 7, different alternative embodiments of the proposed bearing 5 are schematically shown.

Figure 5A:
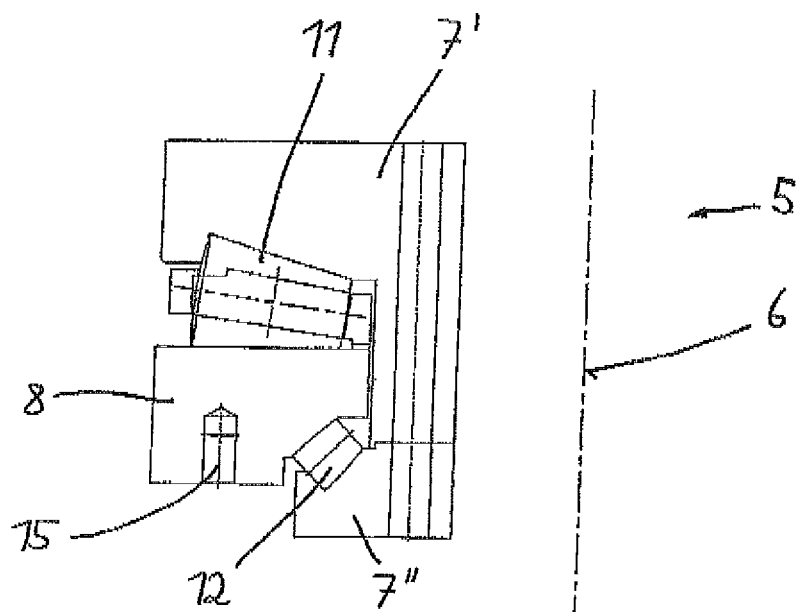
FIG. 5a to FIG. 5f show schematic illustrations of different designs of bearings having a one-piece bearing outer ring and a two-piece bearing inner ring.
Figure 5B:
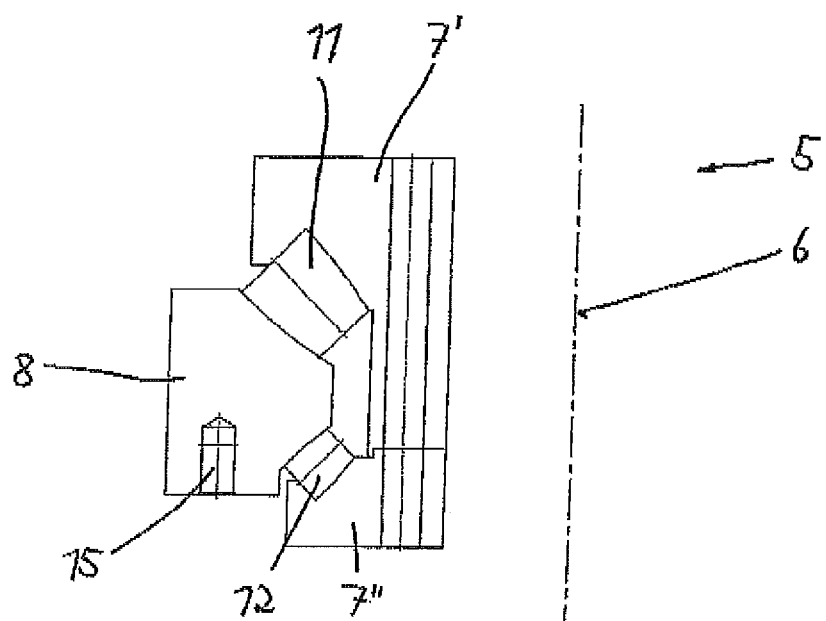
Figure 5C:
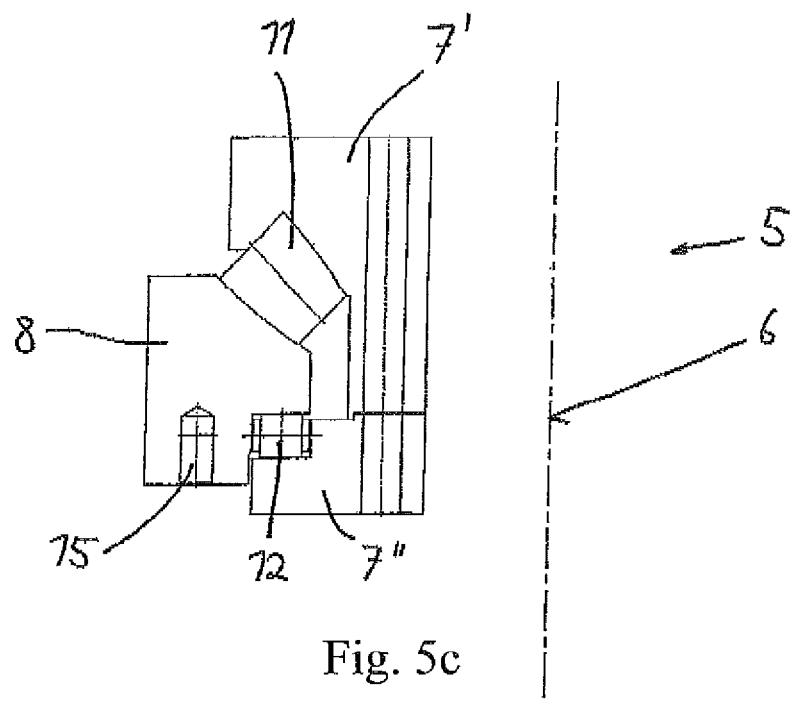

In FIGS. 5a to 5f, respective embodiments are illustrated, in which a two-piece bearing inner ring 7', 7" is utilized, whereas the bearing outer ring 8 is embodied as one-piece. A tapered roller bearing is utilized as a main thrust bearing almost in every case. In FIGS. 5b and 5c, however, a spherical roller thrust bearing (with the roller bodies 11) is utilized as an alternative.

Figure 5D:
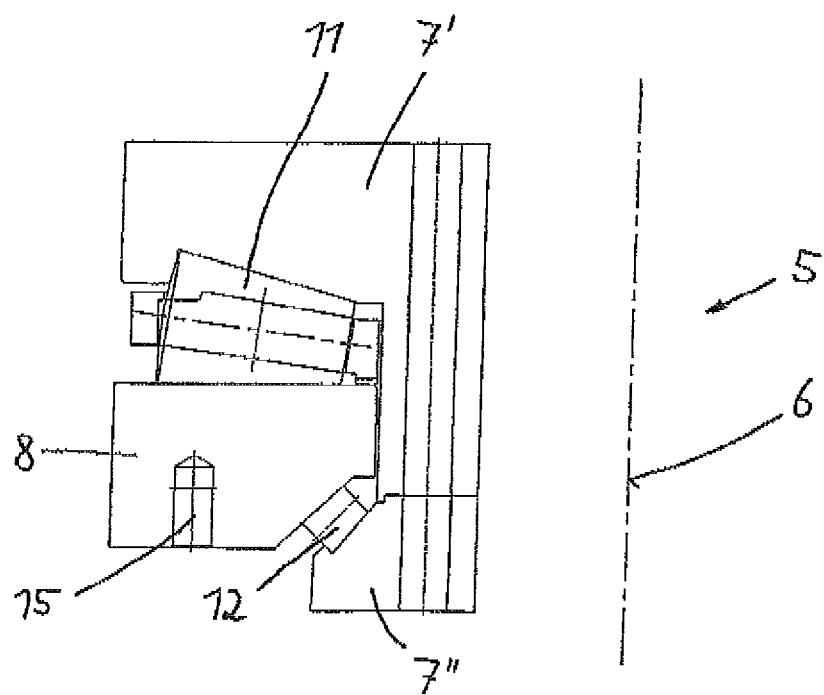
Figure 5E:
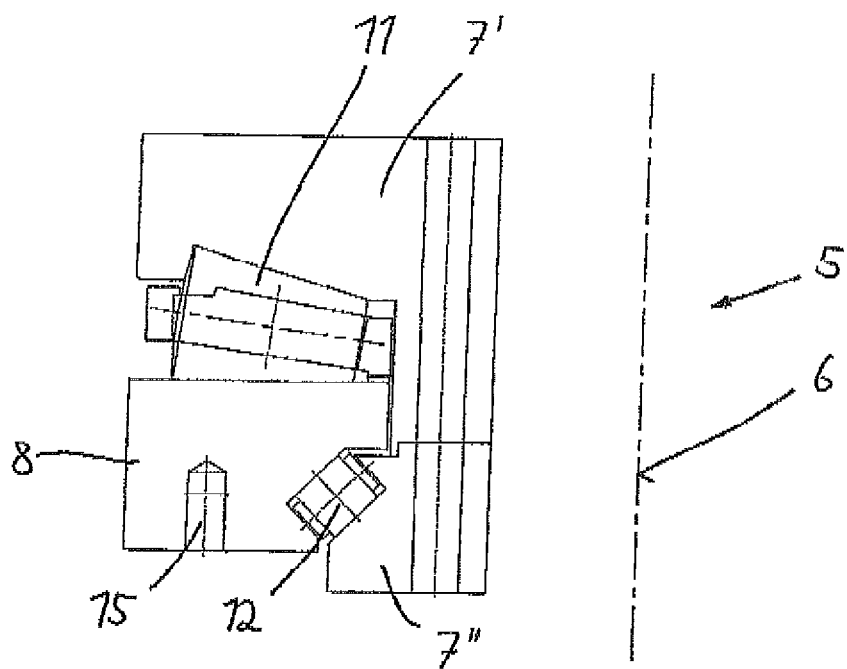
Figure 5F:
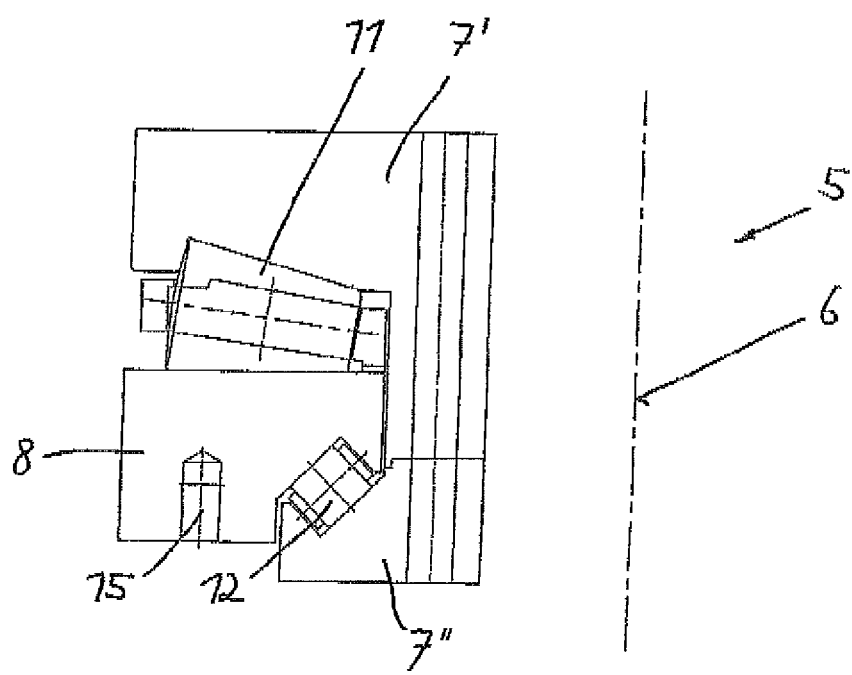

In addition, a second bearing (with the roller bodies 12) is utilized in each case. In FIGS. 5a and 5b, it is a combined thrust and radial bearing in the form of a spherical roller bearing. In FIG. 5c, it is a pure cylindrical roller thrust bearing, because the spherical roller bearing with the roller bodies 11 can also support radial forces. In FIG. 5d, it is a tapered roller bearing and in FIGS. 5e and 5f it is a cylindrical roller bearing, which can support combined axial and radial forces, because the axis of the cylindrical rollers 12 is positioned at an angle (of about 45°) to the axis 6.

In FIGS. 6 and 7, different embodiments with (in some, split) bearing outer ring 8', 8" and one-piece bearing inner ring 7 are shown, and in some with one-piece inner ring 7 and one-piece outer ring 8.

Figure 6A:
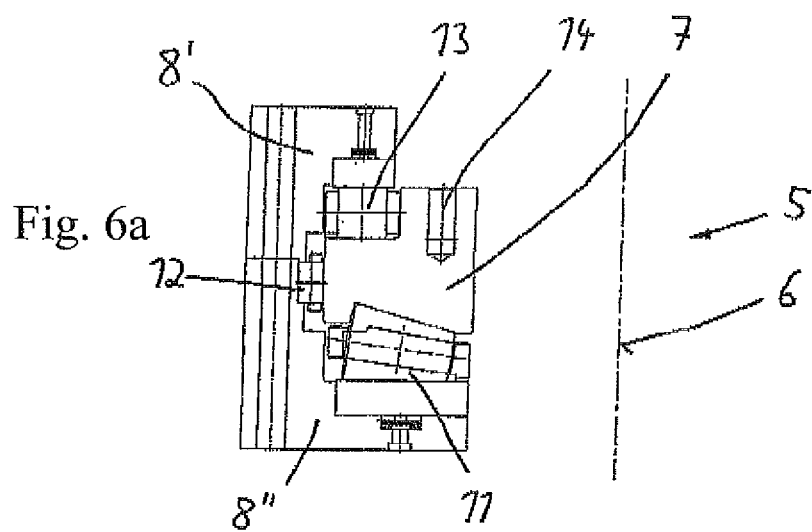
FIG. 6a to FIG. 6h show schematic illustrations of different designs of bearings having a one-piece bearing outer ring and a two-piece bearing inner ring or having a one-piece bearing inner ring and a one-piece bearing outer ring.
Figure 6B:
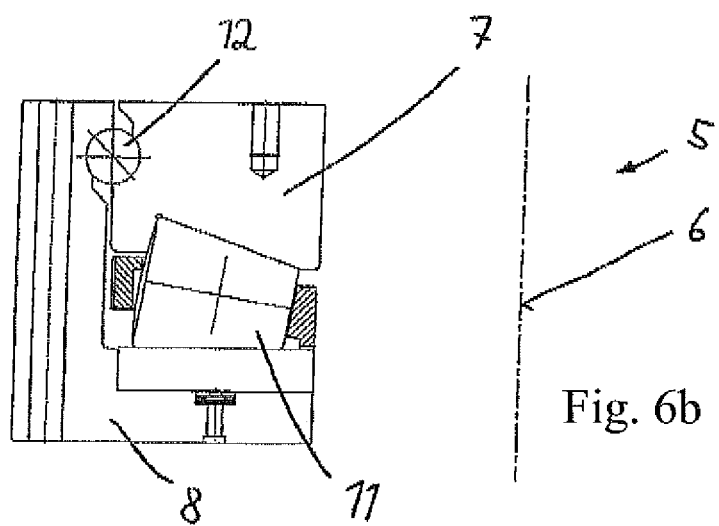
Figure 6C:
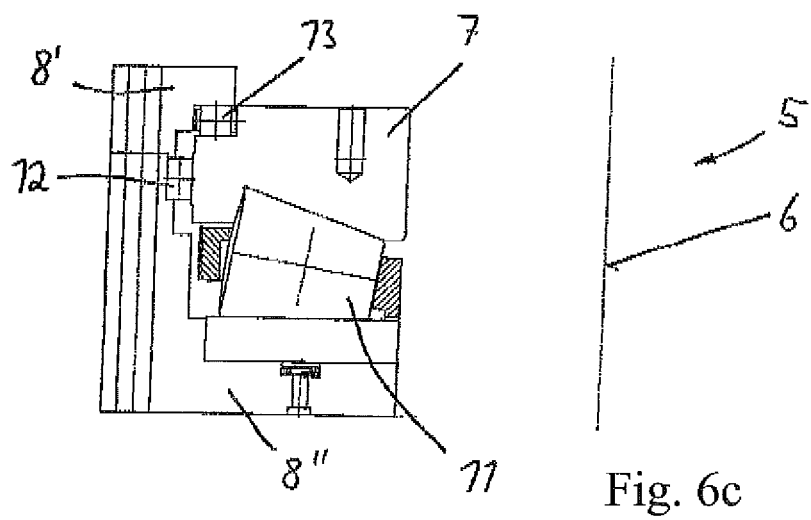
Figure 6D:
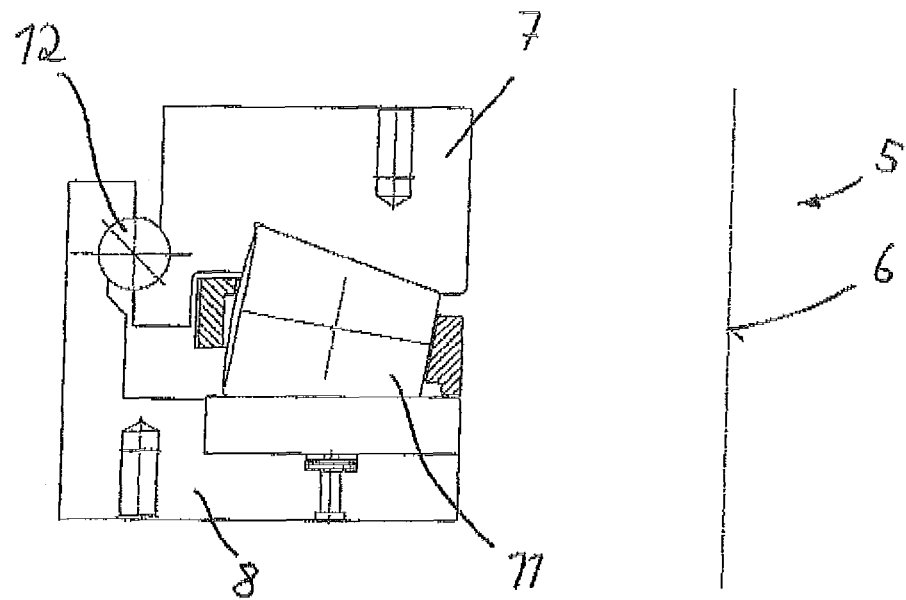
Figure 6E:
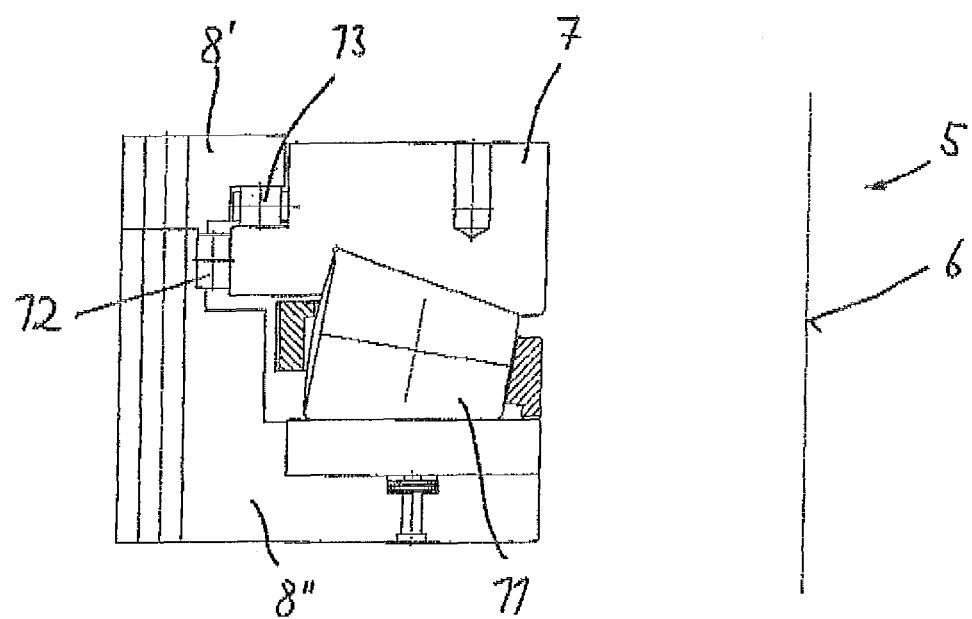
Figure 6F:
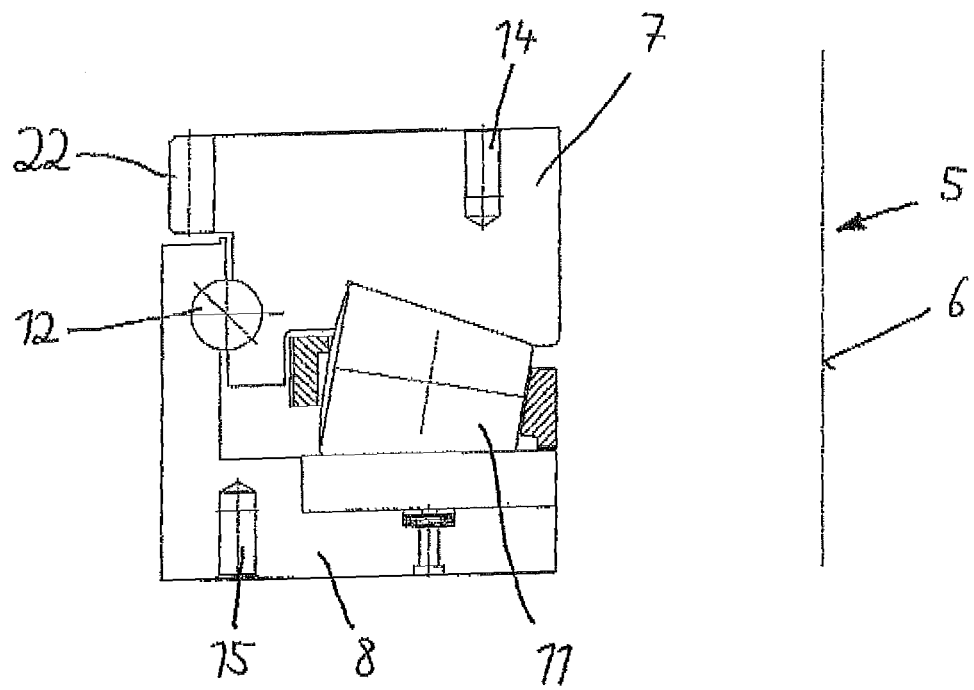
Figure 6G:
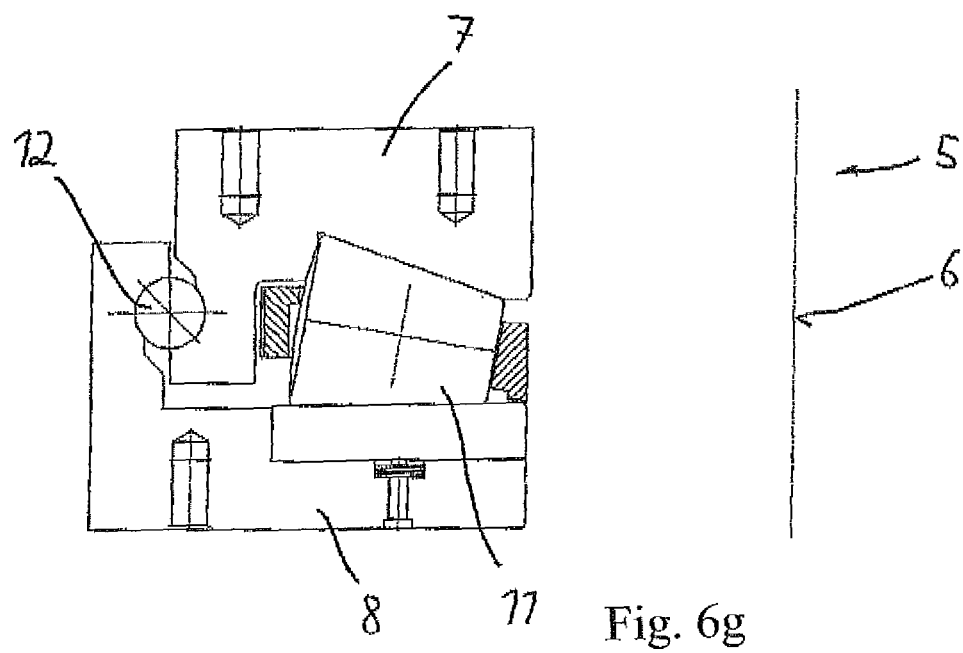
Figure 6H:
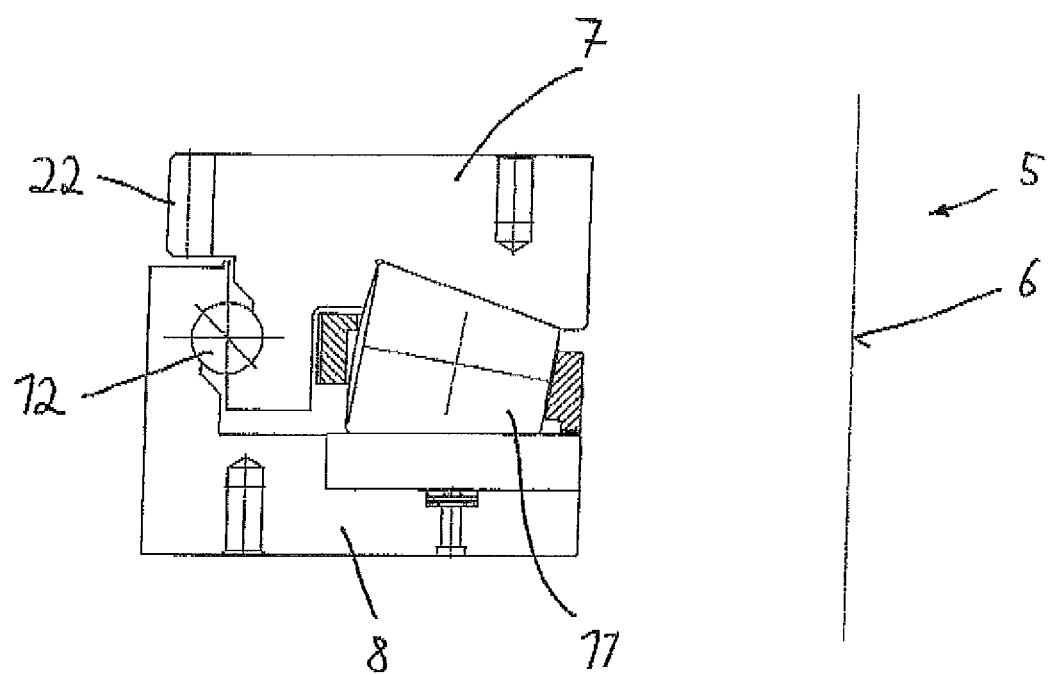
Figure 7A:
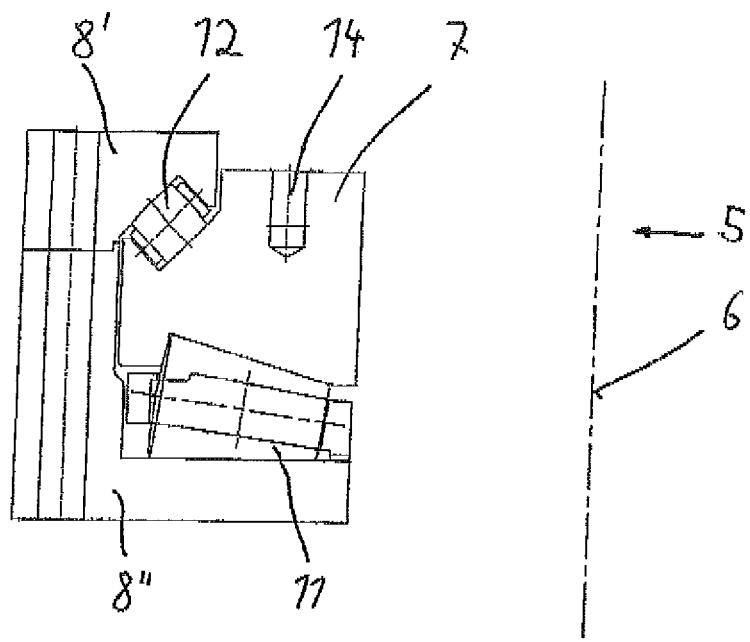
FIG. 7a to FIG. 7e show schematic illustrations of different additional designs of bearings having a one-piece bearing inner ring and a two-piece bearing outer ring.
Figure 7B:
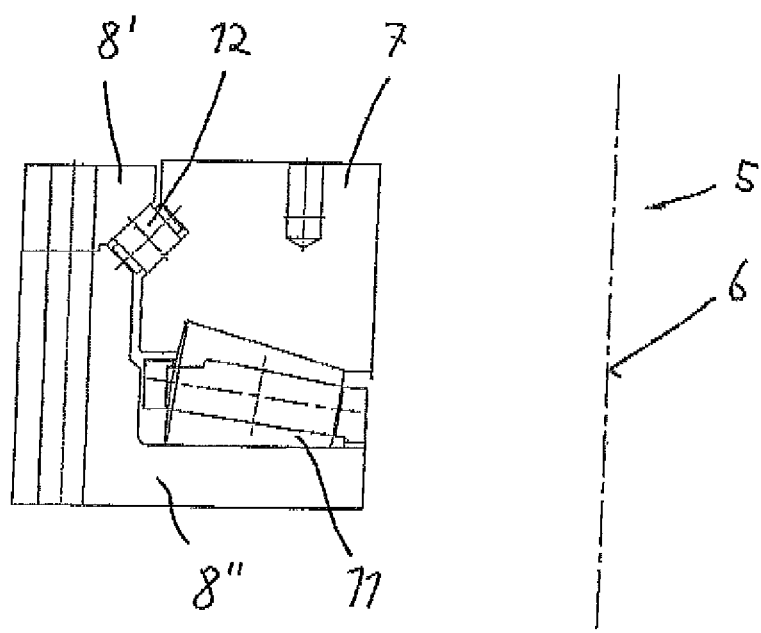
Figure 7C:
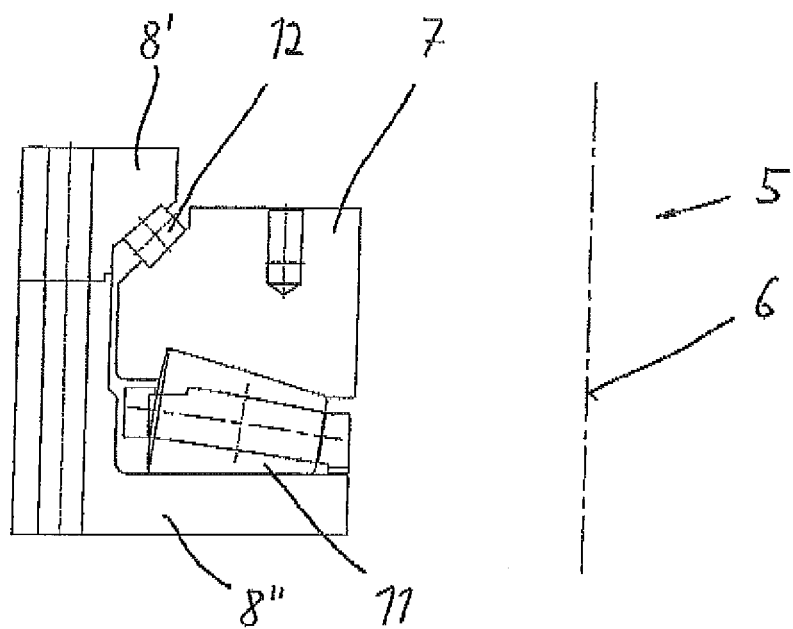
Figure 7D:
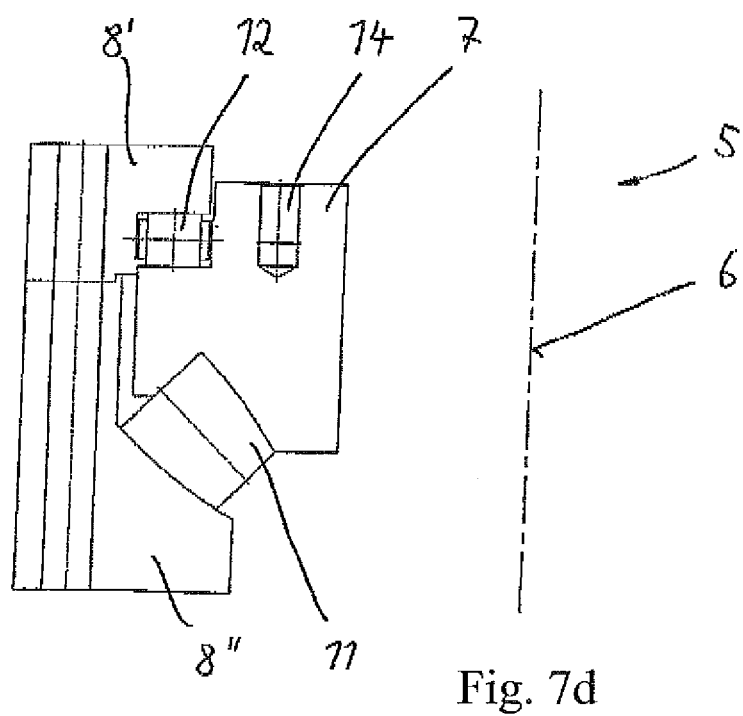
Figure 7E:
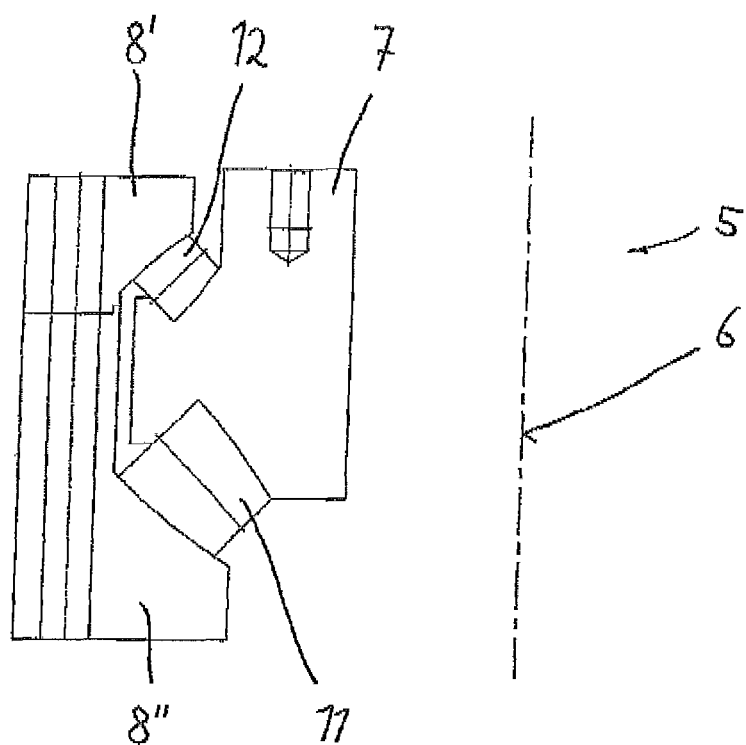

According to FIG. 6a, the embodiment according to FIG. 3 is, in essence, shown once again. In FIG. 6b, a ball bearing with the balls 12 is utilized as a combined radial and thrust bearing, which can be embodied as an angular contact roller bearing or a four-point-contact bearing. The embodiment according to FIG. 6c is closely related to the embodiment to FIG. 3. In the embodiment according to FIG. 6d, a one-piece bearing inner ring 7 as well as a one-piece bearing outer ring 8 is utilized; a suitable fill-slot for the balls 12 is thus necessary, but is not illustrated. FIG. 6e is again similar to the embodiment according to FIG. 3. In the embodiment according to FIG. 6f, the bearing inner ring 7 has gear teeth 22 for directly rotationally driving the inner ring 7 (i.e. a "top drive" embodiment). FIGS. 6g and 6h again show tapered roller thrust bearings 11 in combination with ball bearings 12.

In the embodiments according to FIG. 7, the bearing outer ring 8', 8" is again two-pieced and the bearing inner ring 7 is one-piece. It is again illustrated that different combinations of the bearing types are possible. Tapered roller bearings with tapered rollers 11 (FIGS. 7a, 7b and 7c) and spherical rollers 11 (FIGS. 7d and 7e), respectively, are utilized as main thrust bearings. The bearing with the roller bodies 12 supports, in most cases, combined axial and radial forces (exception: FIG. 7d) and are embodied as cylindrical roller bearings (FIGS. 7a, 7b and 7d), a tapered roller bearing (FIG. 7c) or a spherical roller bearing (FIG. 7e). The pressure angle of the tapered roller bearing is, in most cases, in the area of 45°, but can deviate therefrom.

The invention claimed is:

1. A bearing assembly for a drilling rig, comprising:
a swivel body having a suspension bracket,
a drill pipe support, and
a bearing disposed between the swivel body and the drill pipe support, the bearing being configured to radially and axially support the drill pipe support relative to the swivel body and to enable rotation of the drill pipe support about a rotational axis relative to the swivel body, the rotational axis extending in an axial direction, the bearing comprising:
a bearing inner ring consisting of one part or comprising two parts, at least three roller body tracks being defined in or on the bearing inner ring,
a bearing outer ring consisting of one part or comprising two parts, at least three roller body tracks being defined in or on the bearing outer ring, the respective roller body tracks of the bearing outer ring opposing the respective roller body tracks of the bearing inner ring, and
at least first and second and third rows of roller bodies respectively disposed between each set of opposing roller body tracks, wherein the first row of roller bodies comprises tapered rollers and the second row of roller bodies comprises cylindrical rollers configured and disposed to support radial forces, and the third row of roller bodies comprises cylindrical rollers configured and disposed to support axial forces,
wherein the bearing inner ring has a central opening coaxial with the rotational axis, and wherein none of the at least first and second and third rows of roller bodies are disposed in the central opening and no other roller bodies are disposed in the central opening, and wherein a projection of the roller bodies of the third row of roller bodies in the axial direction intersects the first row of roller bodies and does not intersect the second row of roller bodies.

2. The bearing assembly according to claim 1, wherein at least one of the bearing inner ring and the bearing outer ring is provided with at least one bore extending in the direction of the rotational axis.

3. The bearing assembly according claim 1, further comprising:
at least one track ring defining the first roller body track and being disposed in the outer bearing ring, and
a spring biasing the at least one track ring relative to the bearing ring supporting the outer track ring in the direction of the rotational axis.

4. The bearing assembly according to claim 1, wherein the bearing inner ring is one-piece, the bearing outer ring is two-pieces and a track ring is disposed in each respective bearing outer ring piece, each track ring being biased by a spring in the direction of the rotational axis.

5. The bearing assembly according to claim 1, wherein at least one of the bearing inner ring and the bearing outer ring has a gear teeth configured to engage a drive pinion.

6. The bearing assembly according to claim 1, wherein said bearing is the sole bearing of the bearing assembly.

7. The bearing assembly according to claim 1, wherein at least one of the bearing rings has at least one thread defined.

8. The bearing assembly according to claim 1,
wherein at least one of the bearing inner ring and the bearing outer ring comprises two parts,
wherein, if the bearing inner ring comprises two parts, each of the two parts of the bearing inner ring comprises at least one of the at least two roller body tracks of the bearing inner ring and a contacting surface, and wherein the contacting surfaces of the two parts of the bearing inner ring abut one another directly, and
wherein, if the bearing outer ring comprises two parts, each of the two parts of the bearing outer ring comprises at least one of the at least two roller body tracks of the bearing outer ring and a contacting surface, and wherein the contacting surfaces of the two parts of the bearing outer ring abut one another directly.

9. The apparatus according to claim 1, wherein the tapered rollers each have a first end surface and a second end surface smaller than the first end surface, the second end surface being located radially inward of the first end surface,
wherein the first end surfaces of the tapered rollers are arranged in a band on a conical surface, and
wherein the conical surface intersects the third row of roller bodies.

10. An apparatus, comprising:
a stationary body,
a rotatable body, and
a bearing disposed between the stationary body and the rotatable body, the bearing being configured to enable the rotatable body to rotate about a rotational axis relative to the stationary body, the rotational axis extending in an axial direction, the bearing comprising:
a bearing inner ring having at least first and second and third roller body tracks provided in or on non-parallel surfaces of the bearing inner ring, the first roller body track of the bearing inner ring being conical,
a bearing outer ring having at least first and second and third roller body tracks provided in or on surfaces of the bearing outer ring, the first roller body track of the bearing outer ring opposing the first roller body track of the bearing inner ring and the second roller body track of the bearing outer ring opposing the second roller body track of the bearing inner ring and the third roller body track of the bearing outer ring opposing the third roller body track of the bearing inner ring, and
at least first and second and third rows of roller bodies respectively disposed between each set of roller body tracks, wherein the first row of roller bodies comprises tapered rollers, the third row of roller bodies is configured to support exclusively axial forces and the second row of roller bodies is configured to support exclusively radial forces, and
wherein at least one of the bearing inner ring and the bearing outer ring comprises two parts,
wherein, if the bearing inner ring comprises two parts, each of the two parts of the bearing inner ring comprises at least one of the first, second and third roller body tracks of the bearing inner ring and a contacting surface, and wherein the contacting surfaces of the two parts of the bearing inner ring abut one another directly, and
wherein, if the bearing outer ring comprises two parts, each of the two parts of the bearing outer ring comprises at least one of the first, second and third roller body tracks of the bearing outer ring and a contacting surface, and wherein the contacting surfaces of the two parts of the bearing outer ring abut one another directly,
wherein the tapered rollers each have a first end surface and a second end surface smaller than the first end surface, the second end surface being located radially inward of the first end surface,
wherein the first end surfaces of the tapered rollers are arranged in a band on a conical surface, and
wherein the conical surface intersects the third row of roller bodies.

11. The apparatus according to claim 10, wherein the first roller body track of the bearing outer ring extends substantially perpendicularly to the rotational axis.

12. An apparatus according to claim 11, wherein the second roller body tracks of the bearing inner and outer rings extend at an angle between 30-60° to the rotational axis.

13. The apparatus according to claim 11, wherein the roller bodies disposed between the second roller body tracks of the bearing inner and outer rings are cylindrical roller bodies.

14. The bearing assembly according to claim 10, wherein the bearing inner ring has a central opening coaxial with the rotational axis, and wherein none of the at least first, second and third rows of roller bodies are disposed in the central opening and no other roller bodies are disposed in the central opening.

15. The apparatus according to claim 14, wherein a projection of the roller bodies of the third row of roller bodies in the axial direction intersects the first row of roller bodies and does not intersect the second row of roller bodies.

16. The apparatus according to claim 10, wherein the roller bodies disposed between the second roller body tracks of the bearing inner and outer rings are cylindrical roller bodies and the roller bodies disposed between the third roller body tracks of the bearing inner and outer rings are cylindrical roller bodies.

17. The apparatus according to claim 16, wherein a projection of the roller bodies of the third row of roller bodies in the axial direction intersects the first row of roller bodies and does not intersect the second row of roller bodies.

18. The bearing assembly according to claim 17, wherein the outer ring roller body track of the first row of roller bearings comprises a plate spring-biased in the axial direction and the inner ring roller body track of the first row of roller bearings is not parallel or perpendicular to the rotational axis.

19. The bearing assembly according to claim 10, wherein the bearing outer ring first roller body track comprises a spring-biased plate having a surface perpendicular to the axis of rotation and facing the bearing inner ring first roller body track and the bearing outer ring third roller body track comprises a spring-biased plate having a surface perpendicular to the axis of rotation and facing the bearing inner ring third roller body track of the bearing inner ring,
   wherein the spring-biased plate of the bearing outer ring first roller body track radially overlaps the spring-biased plate of the bearing outer ring third roller body track, and
   wherein the bearing inner ring second roller body track lies radially outward of the bearing inner ring first roller body track and radially outward of the bearing inner ring third roller body track.

20. A swivel body for a drilling rig, comprising:
   a stationary base body including a hook,
   a drill string support depending from the base body, and
   a bearing disposed between the base body and the drill string support configured to support the drill string support for rotation about an axis relative to the base body when the hook is disposed above the drill string support, the bearing comprising:
   a bearing inner ring having a first roller body track comprising a downwardly facing conical surface, a second roller body track parallel to the axis of rotation and facing away from the axis of rotation and a third roller body track perpendicular to the axis of rotation and facing upward,
   a bearing outer ring having a first roller body track comprising a spring-biased plate having a surface perpendicular to the axis of rotation and facing the bearing inner ring first roller body track, a second roller body track parallel to and facing the bearing inner ring second roller body track and a third roller body track comprising a spring-biased plate having a surface perpendicular to the axis of rotation and facing the bearing inner ring third roller body track,
   a first row of tapered roller bodies disposed between the inner bearing ring first roller body track and the outer bearing ring first roller body track,
   a second row of cylindrical roller bodies disposed between the inner bearing ring second roller body track and the outer bearing ring second roller body track, and
   a third row of cylindrical roller bodies disposed between the inner bearing ring third roller body track and the outer bearing ring third roller body track,
   wherein, the bearing outer ring comprises two parts having contacting surfaces that abut one another directly, the outer bearing ring first track and outer bearing ring second track are located on a first one of the two parts and the outer bearing ring third track is located on a second one of the two parts,
   wherein the spring-biased plate of the bearing outer ring first roller body track radially overlaps the spring-biased plate of the bearing outer ring third roller body track,
   wherein the bearing inner ring second roller body track lies radially outward of the bearing inner ring first roller body track and radially outward of the bearing inner ring third roller body track, and
   wherein the inner bearing ring has a central opening coaxial with the axis of rotation, and wherein none of the first, second and third rows of roller bodies are disposed in the central opening and no other roller bodies are disposed in the central opening.

21. The apparatus according to claim 20, wherein a projection of the roller bodies of the third row of roller bodies in the axial direction intersects the first row of roller bodies and does not intersect the second row of roller bodies.

* * * * *